S. S. SEYFERT.
ELECTRIC MOTOR AND TRANSMISSION SYSTEM FOR LOCOMOTIVES AND OTHER PURPOSES.
APPLICATION FILED FEB. 2, 1914.
1,285,809.
Patented Nov. 26, 1918.
2 SHEETS—SHEET 1.
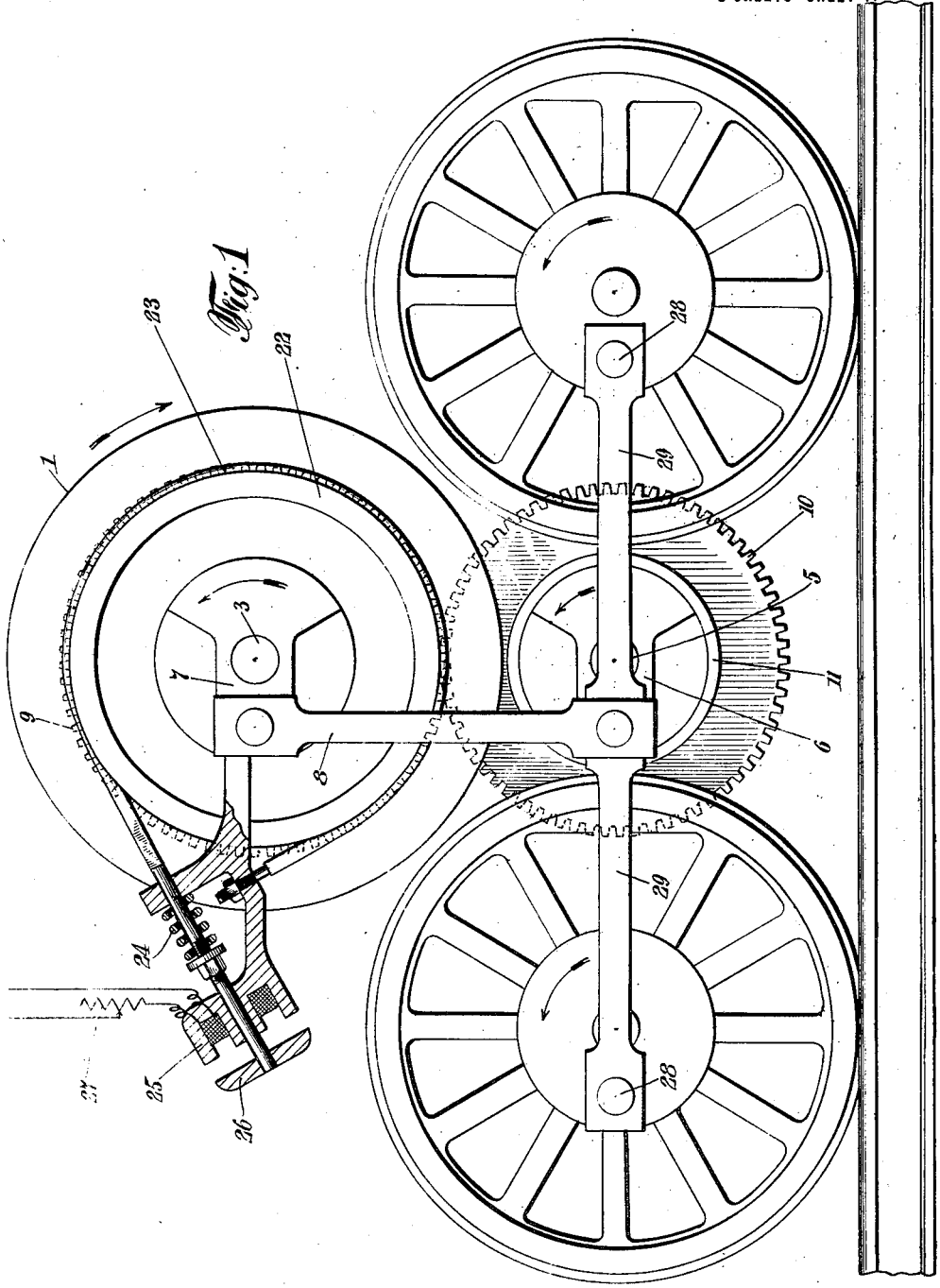

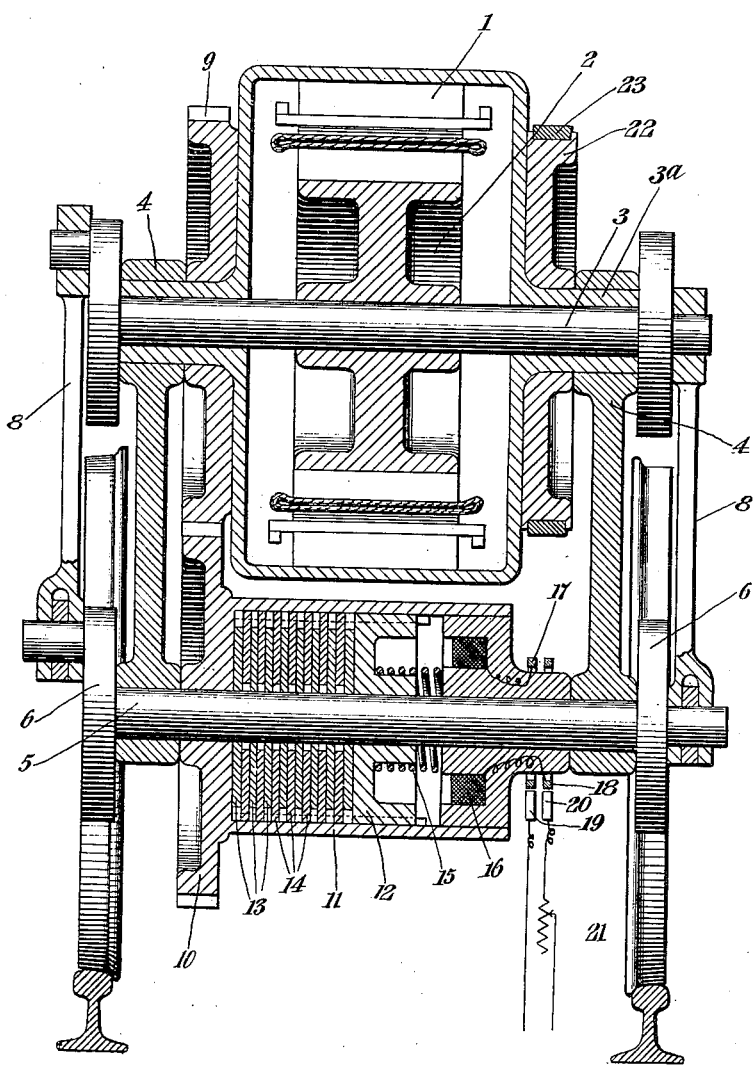

UNITED STATES PATENT OFFICE.

STANLEY S. SEYFERT, OF SOUTH BETHLEHEM, PENNSYLVANIA, ASSIGNOR, BY DIRECT AND MESNE ASSIGNMENTS, TO HIMSELF AND WILLIAM S. FRANKLIN, AS TRUSTEES, OF SOUTH BETHLEHEM, PENNSYLVANIA.

ELECTRIC MOTOR AND TRANSMISSION SYSTEM FOR LOCOMOTIVES AND OTHER PURPOSES.

1,285,809. Specification of Letters Patent. Patented Nov. 26, 1918.

Application filed February 2, 1914. Serial No. 815,879.

*To all whom it may concern:*

Be it known that I, STANLEY S. SEYFERT, of South Bethlehem, in the county of Northampton, and in the State of Pennsylvania, have invented a certain new and useful Improvement in Electric Motors and Transmission Systems for Locomotives and other Purposes, and do hereby declare that the following is a full, clear, and exact description thereof.

The object of my invention has been to provide an improved electric motor and a system of transmitting power from the motor to the drivers of a locomotive, which motor and system of transmission shall be capable of use for other purposes than locomotives, and which shall possess one or more of the following advantages:

That of greatly increasing the rating of the motor for a given weight and peripheral speed; that of greatly increasing the starting torque; that of greatly increasing the running torque, if desired; and that of permitting an increase up to doubling the torque at starting, while also permitting the usual mode of operation of the motor at higher speeds.

In the accompanying drawings—

Figures 1 and 2 are, respectively, a side elevation and a vertical sectional view of an adaptation of my invention to locomotive practice.

My invention is capable of embodiment in many different forms and for use for many different purposes, and while I have illustrated the best embodiment thereof known to me, such embodiment is to be regarded as typical only of many possible embodiments, and my invention is not to be confined thereto.

In the accompanying drawings are shown an electric motor having an outer member 1 and an inner member 2, which are mounted upon a shaft 3, the inner member being preferably fixed upon the shaft and the shaft having bearings in sleeves 3ª which are mounted in stationary bearings 4 on the frame. In the present instance I have illustrated the motor shaft as separate from the driver shafts and raised above the drivers, and the motor, as transmitting motion to a jack shaft 5 from which motion is transmitted to the drivers. The jack shaft is provided with cranks 6, one on each end, which cranks are preferably set 90° apart. The motor shaft 3 is provided with cranks 7 of the same throw as the cranks 6, the cranks 6 and 7 being connected by side bars 8. Thus the motion of the inner motor member is transmitted to the jack shaft. The outer motor member 1 carries a gear 9, which meshes with a gear 10 loosely mounted on the jack shaft. The gear 10 is shown as directly connected with one member of a friction clutch 11 whose other member 12 is splined upon the jack shaft. In the present instance the friction clutches are shown as having two sets of disks 13 and 14, respectively, the disks of one set alternating with those of the others. The disks 14 are splined to the clutch member 11, and the disks 13 are splined to the clutch member 12. The disks are engaged by means of a spring 15, and are disengaged by means of an annular electric magnet 16. The terminals of the coil of the electric magnet are respectively connected with slip-rings 17 and 18, which are engaged by brushes 19 and 20 respectively, a rheostat 21 being interposed in the circuit so that the strength of current supplied to the magnet can be regulated. When the magnet is excited the clutch is disengaged and the gear 10 is free from the jack shaft, thus leaving the outer motor member free to revolve.

For purposes later to be described, I desire to be able to hold the outer member of the motor stationary when it is disconnected from the jack shaft. For this purpose the outer member may be provided with a brake-disk 22 engaged by a brake-band 23, which band is normally drawn taut by a spring 24, and is released by the attraction of a magnet 25 for an armature 26 on a rod attached to the brake-band, such magnet being operated through a rheostat 27. Thus the spring normally draws the brake-band tight and holds the outer motor section from rotation while the excitation of the magnet 25 releases the brake-band.

Motion is transmitted from the crank 6 of the jack shaft to the crank pins 28 of the drivers by means of connecting rods 29.

The drawings show the primary and secondary members of an induction motor, although the arrangement may be applied to any other form of electric motor.

The operation of my invention is based upon the following fundamental principles: Permitting the field and armature, or primary and secondary members of the motor, as the case may be, to rotate in opposite directions greatly increases their relative speed, which causes a corresponding increase in the rating; permitting both members to rotate and suitably transmit the torque exerted by each of the two members separately to the drivers increases the torque obtained.

The provision of means for holding one member stationary and at the same time disengaging the mechanical connection between it and the drivers, but leaving the connection between the other member and the drivers undisturbed, enables the motor to be changed from its condition of doubling torque operation to the usual condition of operation in which a higher speed of the locomotive is obtainable.

In the operation of the illustrated embodiment of my invention: when it is desired to permanently run both members of the motor, for the purpose of increasing the rating at all speeds, the clutch and the brake may be omitted. In this case the gear ratio might preferably be greater than one to one, thus keeping down the peripheral speed of the outer member.

When it is desired to allow both members to run at starting the locomotive, and during its acceleration, in order to obtain a heavy starting torque speed, finally bringing the motor to the ordinary method of operation with the outer member stationary, the clutch is engaged and the brake is open or disengaged at the start. When sufficient speed has been obtained the brake is thrown on and the clutch opened at the same time, thus reducing the torque but increasing the speed. In case the locomotive should approach a steep mountain grade while pulling a heavy load, the motor would be thrown back to the arrangement used at starting (namely, with the clutch on and the brake off) thus giving an increased draw-bar pull.

Although my invention is useful with all electric locomotives, the illustrated embodiment is particularly adapted to the single-phase locomotive because with single-phase motors it is found difficult to "slip the drivers", that is, to obtain sufficient torque at starting, or to produce a motor of reasonable rating at reasonable cost.

My invention should be of exceptional benefit to induction motor locomotives because of the narrow economical range of speed of the induction motor. By the use of the brake and clutch as described, two economical locomotive speeds are obtainable with a given frequency. By combining this system with the "cascade" method of control, four economical locomotive speeds can be obtained.

As before stated, my invention is capable of embodiment in many different forms. For instance, instead of using spur gearing to transmit torque from the outer member of the motor to the clutch shaft, such transmission might be by the use of bevel gearing and this would be particularly desirable in case the axis of the motor should be parallel to the length of the locomotive, or with such position of the motor there might be a rolling friction drive either of the jack shaft or of the driver axles directly, using, preferably, rollers provided with quills on the axles.

The clutch and brake might be operated by a purely mechanical movement or by the use of compressed air.

The jack shaft could be omitted entirely in some cases, and could, of course, be put in other positions.

Two motors of similar rating could be used to operate the same jack shaft with a consequent lessening of the head room required, better weight distribution, reduction of stresses in the shaft, etc.

I claim—

1. In an electric locomotive, the combination of a frame, drivers and an axle upon which they are mounted, a shaft journaled in said frame, two motor members mounted on said shaft, and separate gearing connecting each of said motor members with said drivers, said gearing for one of said motor members directly connecting said motor member and said axle, said gearing for the other of said motor members being connected through the intervention of a clutch, said last mentioned motor member having a brake by which it can be held from rotation.

2. In an electric locomotive, the combination of a frame, drivers and an axle upon which they are mounted, a shaft journaled in said frame, two motor members mounted on said shaft, separate gearing connecting each of said motor members with said drivers, said gearing for one of said motor members directly connecting said motor member and said axle, said gearing for the other of said motor members being connected through the intervention of a clutch, said last mentioned motor member having a brake by which it can be held from rotation, said clutch being mounted on said axle and comprising an electromagnet, and slip rings connected with said clutch.

3. In an electric locomotive, driving wheels, two motor members, and means to connect said driving wheels and said motor members comprising side or parallel rods for transmitting the motion from one member and gearing for transmitting the motion from the other member.

4. In an electric locomotive, driving wheels, two motor members, means to connect said driving wheels and said motor members comprising side or parallel rods for transmitting the motion from one member and gearing for transmitting the motion from the other member, and means for causing said geared member to become stationary without preventing the motion of the other member.

5. In an electric locomotive, driving wheels, two motor members, and means to connect said driving wheels and said motor members comprising means for transmitting the rotation of one motor member to said driving wheels in either direction and means for transferring the rotation of the other motor member to said driving wheels in the same direction as that transmitted by said first motor member.

6. In an electric locomotive, driving wheels, two motor members, and means to connect said driving wheels and said motor members comprising means normally connecting one of said motor members to said driving wheels, a brake normally holding the other of said motor members, and a normally disengaged clutch adapted to connect said last-named motor member with said driving wheels.

7. In an electric locomotive, driving wheels, two motor members, and means to connect said driving wheels and said motor members comprising means normally connecting one of said motor members to said driving wheels, a brake normally holding the other of said motor members, a normally disengaging clutch adapted to connect said last-named motor member with said driving wheels, and means to operate said brake and said clutch simultaneously.

8. In an electric locomotive, driving wheels, two motor members, and means to connect said driving wheels and said motor members comprising means normally connecting only one of said motor members to said driving wheels, a brake for the other of said motor members, a clutch adapted to connect said last-named motor member with said driving wheels, springs normally holding said brake in operative position and said clutch in inoperative position, and means to release said brake and to connect said clutch.

9. In an electric locomotive, driving wheels, two motor members, and means to connect said driving wheels and said motor members comprising means normally connecting only one of said motor members to said driving wheels, a brake for the other of said motor members, a clutch adapted to connect said last-named motor member with said driving wheels, springs normally holding said brake in operative position and said clutch in inoperative position, and means to release said brake and to connect said clutch simultaneously.

10. In an electric locomotive, driving wheels, two motor members, and means to connect said driving wheels and said motor members comprising a jack shaft, means to connect one of said motor members to said jack shaft to rotate said jack shaft in one direction and means to connect the other of said motor members to said jack shaft to rotate said jack shaft in the same direction.

11. In an electric locomotive, driving wheels, two motor members, and means to connect said driving wheels and said motor members comprising a jack shaft, means to connect one of said motor members to said jack shaft to rotate said jack shaft in one direction and means to connect the other of said motor members to said jack shaft to rotate said jack shaft in the same direction comprising a clutch mounted on said jack shaft.

12. In an electric locomotive, driving wheels, two motor members, and means to connect said driving wheels and said motor members comprising a jack shaft, means to connect one of said motor members to said jack shaft to rotate said jack shaft in one direction and means to connect the other of said motor members to said jack shaft to rotate said jack shaft in the same direction comprising an electric clutch mounted on said jack shaft.

13. In an electric locomotive, driving wheels, two motor members, and means to connect said driving wheels and said motor members comprising a jack shaft, means to connect one of said motor members to said jack shaft to rotate said jack shaft in one direction and means to connect the other of said motor members to said jack shaft to rotate said jack shaft in the same direction comprising an electric clutch mounted on said jack shaft and slip rings concentric with said jack shaft.

14. In an electric locomotive, driving wheels, two motor members, and electrical means to connect said driving wheels and said motor members comprising means for applying a brake to one motor member and at the same time disengaging the motor member from the driving wheels.

15. In an electric locomotive, driving wheels, two motor members, and electrical means to connect said driving wheels and said motor members comprising means for releasing a brake on one motor member and at the same time engaging the motor member with the driving wheels.

16. In an electric locomotive, driving wheels, two motor members, and electrical means to connect said driving wheels and said motor members comprising means for applying a brake to one motor member and at the same time disengaging the motor member from the driving wheels without disengaging the other member from the driving wheels.

17. In an electric locomotive, driving wheels, two motor members, and electrical means to connect said driving wheels and said motor members comprising means for releasing a brake on one motor member and at the same time engaging the motor member with the driving wheels without disengaging the other member from the driving wheels.

In testimony that I claim the foregoing I have hereunto set my hand.

STANLEY S. SEYFERT.

Witnesses:
  EDWIN J. PRINDLE,
  L. BRODERICK.